United States Patent [19]
Pitassi et al.

[11] Patent Number: 5,630,000
[45] Date of Patent: May 13, 1997

[54] MULTI-FIBRE CONNECTOR WITH CYLINDRICAL FERRULES

[75] Inventors: Stefano Pitassi, Udine; Enrico Serafini, Milan, both of Italy

[73] Assignee: Sirti S.p.A., Milan, Italy

[21] Appl. No.: 563,024

[22] Filed: Nov. 27, 1995

[30] Foreign Application Priority Data

Aug. 10, 1995 [IT] Italy ................... MI95A1777

[51] Int. Cl.$^6$ .............................. G02B 6/38
[52] U.S. Cl. .................. 385/62; 385/80; 385/85; 385/59; 385/66
[58] Field of Search ............ 385/85, 80, 60–68, 385/59

[56] References Cited

U.S. PATENT DOCUMENTS 4,330,171  5/1982  Malsot et al. ................. 385/80

FOREIGN PATENT DOCUMENTS

| 0360243 | 3/1989 | European Pat. Off. | ........... 385/85 |
| 58-171016 | 10/1983 | Japan | ........... 385/80 |
| 59-24818 | 2/1984 | Japan | ........... 385/85 |

*Primary Examiner*—John Ngo
*Attorney, Agent, or Firm*—Hedman, Gibson & Costigan, P.C.

[57] ABSTRACT

A multi-fibre connector consisting of a bush acting as a guide and coupling element for two ferrules, which are located one in front of the other and contain a sized hole in which two or more fibres are located in a radial arrangement, said two or more fibres being inserted and glued into the sized hole, after which the entire end surface of the ferrule and fibres is lapped in such a manner as to obtain a convex and/or angled surface. Means are provided for securely coupling together said ferrules and said bush. Said means are in the form of a longitudinal slit provided in the bush and a respective shaped insertion element rigidly fixed to a respective one of the facing end parts of said two ferrules, said shaped insertion element engaging in said slit.

6 Claims, 2 Drawing Sheets

MULTI-FIBRE CONNECTOR WITH CYLINDRICAL FERRULES

This invention relates to a multi-fibre connector with cylindrical ferrules.

In the current state of the art, a single optical fibre connector uses a structure of the following briefly described type. The connector comprises two cylindrical ferrules, one for each of the two fibres, into which the fibres are inserted with adequate preparation. This preparation, which is described for example in patent application MI 95 A 000921, involves firstly inserting and gluing the optical fibre into the sized hole in a cylindrical ferrule. The entire end surface of the ferrule and fibre is then lapped such as to obtain a convex surface without roughness and possibly angled. This machining facilitates contact between the fibres when connecting together the two fibres, the end surfaces of which are put under mutual compression. This ensures a more stable and time-repeatable optical performance (insertion and return losses). The ferrules are aligned by means of a bush in which a longitudinal slit provides an elastic pressure effect on the lateral surface of the ferrules.

The object of the present invention is to provide a connector able to simultaneously connect together 2, 3, 4 or more optical fibres (multiple connection), whether multimodal or monomodal.

The present invention provides a multi-fibre connector consisting of a bush acting as a guide and coupling element for two ferrules, which are located one in front of the other and contain a sized hole in which two or more fibres are located in a radial arrangement, wherein said two or more fibres are inserted and glued into the sized hole, after which the entire end surface of the ferrule and fibres is lapped in such a manner as to obtain a convex and/or angled surface, means being provided for securely coupling together said ferrules and said bush.

Advantageously, in a preferred embodiment of the present invention, said means for securely coupling together said ferrules and said bush are in the form of a longitudinal slit provided in the bush and a respective shaped insertion element rigidly fixed to a respective one of the facing end parts of said two ferrules, said shaped insertion element engaging in said slit.

Preferably, the facing end parts of said two ferrules which carry said respective insertion element are frusto-conical. Advantageously, the two ferrules are coupled such as to be put under mutual compression by a helical spring.

More specifically, the present invention enables the multiple connector to be mounted in connector casings of international standard type (type SC-PC, FC-PC etc.) in which the ferrule compression is achieved by a helical spring.

The diameter of said sized hole into which the fibres are inserted and glued in a radial arrangement is such as to limit to a minimum the tolerance between it and the diameter of the fibres housed therein, the outer diameter of the ferrule being the same as that used for SC-PC or FC-PC connectors.

To ensure correct connection of the optical fibre cores, it is essential that each of said ferrules comprises an insertion key which prevents it rotating within the bush. In a preferred case, use is made of the longitudinal slit in the bush which acts as an alignment rail for the ferrule during its insertion. This latter comprises in correspondence with its end portion, and fixed rigidly thereto, an insertion element shaped with a bevel, for example in the form of a small ring with an angle-shaped portion, in which said bevel, ie said angle-shaped portion, is able to engage and fit into the longitudinal slit in said bush, so as to prevent mutual rotation between the bush and ferrule and hence between one ferrule and the other.

This arrangement has the considerable advantage of avoiding the use of particularly elaborate and precision alignment mechanisms, which would risk increasing the weight of the entire structure of the connector, so raising its overall cost.

In completely assembling the connector, the ferrule must be able to be inserted into the alignment bush without the need for any angular optimization by the operator. Advantageously, for this purpose the ends of the bush are inclined, this inclination, in combination with merely an axial push, enabling the insertion ring carried by the ferrule to be inserted into the appropriate slit.

Further advantages and characteristics of the present invention will be more apparent from the ensuing description given with reference to the accompanying drawings. This description and the accompanying drawings are provided as a non-limiting example of the invention, which also embraces modifications, not illustrated herein, lying within the scope of the claims accompanying the present patent application.

Figure 1:
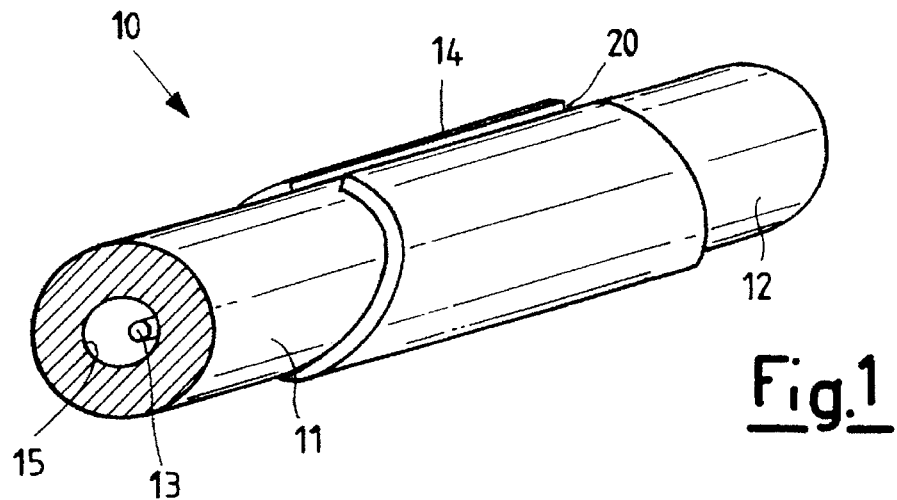
FIG. 1 is a perspective view of a multi-fibre connector according to the present invention.

In FIG. 1 the reference numeral 10 indicates overall a connector without outer casings according to the present invention, comprising a bush 14 containing a slit 20 and into which from the right and left there are inserted two respective ferrules 11 and 12 of ceramic or other suitable material such as filled plastic or hard metal, and comprising a hollow passage 15 into which several fibres 13 are inserted.

Figure 2:
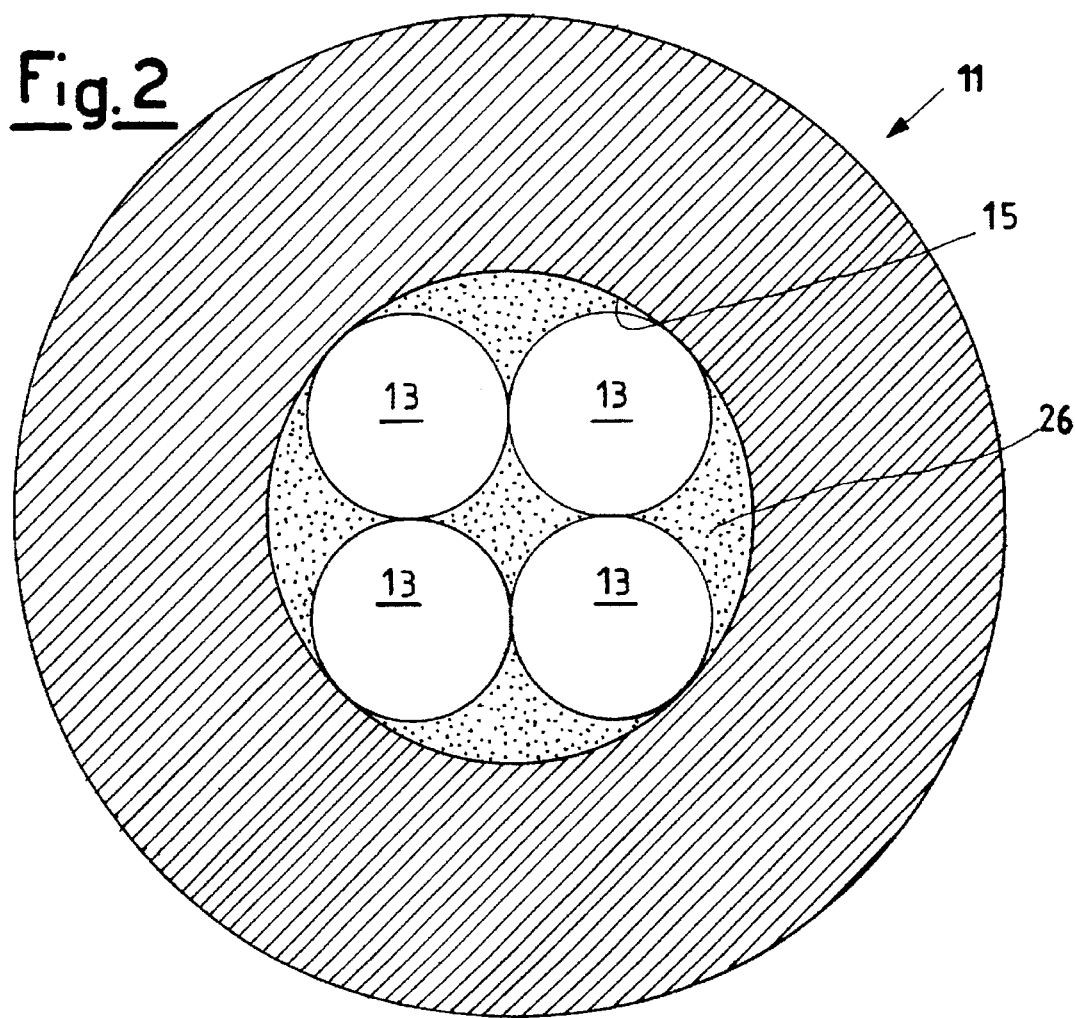
FIG. 2 is a cross-section through a ferrule containing four optical fibres, to be inserted into a multi-fibre connector according to the present invention.

The structure of an individual ferrule is more apparent from FIG. 2, from which it can be seen that the ferrule 11 internally houses, inserted and glued by resin 26 into the hollow central passage 15, four optical fibres 13 arranged with radial symmetry.

The number of optical fibres housed in the ferrule can be other than four, for example two or three, or more than four.

Figure 3:
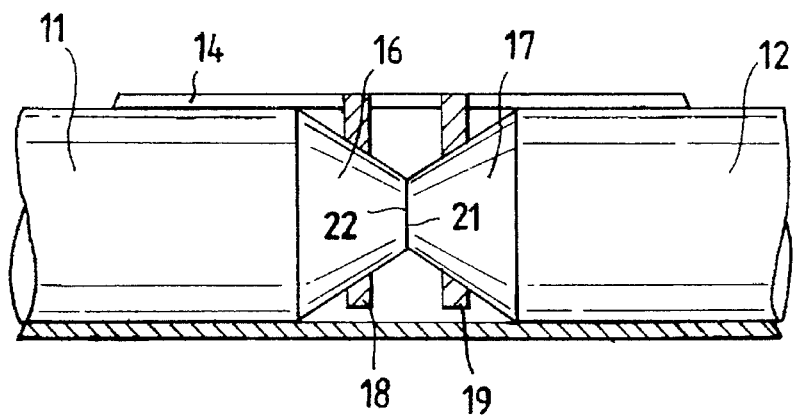
FIG. 3 is a partly sectional side view of the multi-fibre connector according to the present invention as shown in FIG. 1.
Figure 4:
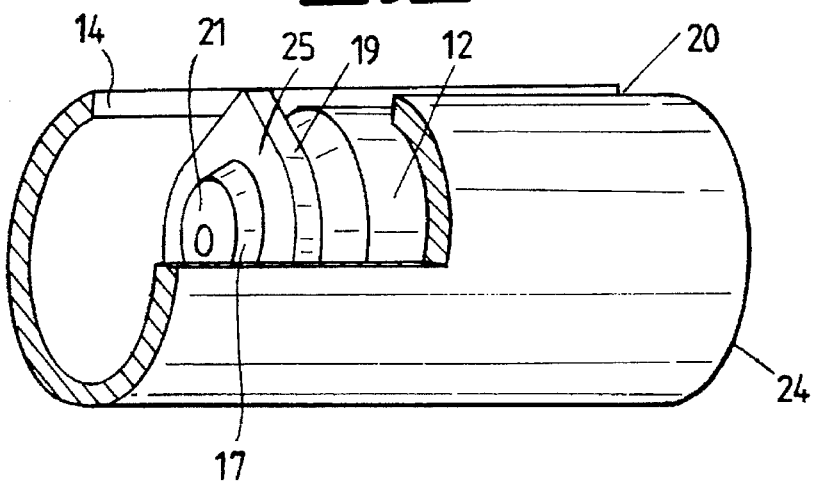
FIG. 4 is a cut-away view of a detail of the multi-fibre connector shown in FIG. 3.
Figure 5:
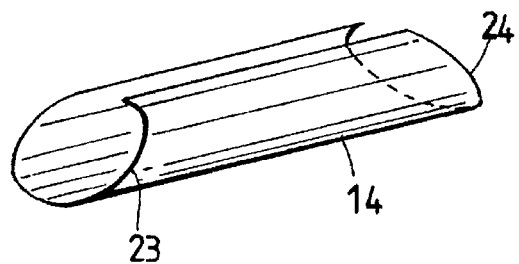
FIG. 5 is an elevational view of the alignment bush for the multi-fibre connector according to the present invention.

The internal structure of the assembled connector 10 is shown in FIGS. 3 and 4. The two ferrules 11 and 12 have a respective end portion 16 and 17 of frusto-conical shape. Before being inserted into the connector 10, the end surface 21 of each ferrule 11 or 12 is machined in the following manner. After inserting and gluing the optical fibres 13 into the hollow passage 15, the entire surface 21 (hence including the end surfaces of the optical fibres 13 inserted into the ferrule 11) is smoothed and lapped such that after lapping it is slightly convex and perfectly free from roughness. The contacting surface 21 can also be advantageously lapped at an angle to reduce optical reflection. At this point the ferrule 11 (or the ferrule 12 respectively) is ready for insertion into the bush 14. Thin holed elements indicated respectively by 18 and 19 are suitably mounted on the frusto-conical portions 16 and 17. Said thin holed elements 18 and 19 are of generally circular shape but with the formation along a certain circular sector of an angular bevel 25 formed by two straight edges which blend into the remaining circular profile. Said thin holed elements 18 and 19 mounted on said portions 16 and 17 are glued to them in a strictly defined position. When the operator inserts the ferrules 11 and 12 into the bush 14, the respective angular bevels 25 fit into the slit 20 with which said bush 14 is provided, so that alignment between the fibres inserted into the ferrule is perfect. The position in which each of the holed elements 18 and 19 is glued onto the respective frusto-conical end portion 16 and 17 relative to the bevel 25 and to the ferrules 11 and 12 must be identical for both ferrules 11 and 12.

This ensures perfect alignment between the facing fibres inserted into the two ferrules 11 and 12.

The bush 14 has slightly inclined end portions 23 and 24 to facilitate the insertion of the ferrules 11 and 12 into said bush 14.

We claim:

1. A multi-fibre connector consisting of a bush acting as a guide and coupling element for two ferrules, which are located one in front of the other and contain a sized hole in which two or more fibres are located in a radial arrangement, characterised in that said two or more fibres are inserted and glued into the sized hole, after which the entire end surface of the ferrule and fibres is lapped in such a manner as to obtain a convex and/or angled surface, means being provided for securely coupling together said ferrules and said bush.

2. A multi-fibre connector as claimed in claim 1, characterised in that said means for securely coupling together said ferrules and said bush are in the form of a longitudinal slit provided in the bush and a respective shaped insertion element rigidly fixed to a respective one of the facing end parts of said two ferrules, said shaped insertion element engaging in said slit.

3. A multi-fibre connector as claimed in claim 2, characterised in that the facing end parts of said two ferrules carrying said respective shaped insertion element are frusto-conical.

4. A multi-fibre connector as claimed in claim 1, characterised in that the two ferrules are coupled such as to be put under mutual compression by a helical spring.

5. A multi-fibre connector as claimed in claim 2, characterised in that said shaped insertion element comprises a bevel, for example an angle-shaped portion, arranged to engage and fit into said longitudinal slit.

6. A multi-fibre connector as claimed in claim 1, characterised in that said bush has its lateral profiles inclined and converging.

* * * * *